(12) United States Patent
Rodrigo et al.

(10) Patent No.: US 10,598,769 B2
(45) Date of Patent: Mar. 24, 2020

(54) COAXIAL DIRECT-DETECTION LIDAR-SYSTEM

(71) Applicant: Danmarks Tekniske Universitet, Lyngby (DK)

(72) Inventors: Peter John Rodrigo, Roskilde (DK); Christian Pedersen, Hvidovre (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 646 days.

(21) Appl. No.: 14/889,404

(22) PCT Filed: May 6, 2014

(86) PCT No.: PCT/DK2014/050128
§ 371 (c)(1),
(2) Date: Nov. 5, 2015

(87) PCT Pub. No.: WO2014/180483
PCT Pub. Date: Nov. 13, 2014

(65) Prior Publication Data
US 2016/0084945 A1 Mar. 24, 2016

(30) Foreign Application Priority Data
May 6, 2013 (EP) ..................... 13166628

(51) Int. Cl.
*G01S 7/481* (2006.01)
*G01S 17/58* (2006.01)
(Continued)

(52) U.S. Cl.
CPC .......... *G01S 7/4812* (2013.01); *G01S 7/4917* (2013.01); *G01S 17/58* (2013.01); *G01S 17/95* (2013.01); *Y02A 90/19* (2018.01)

(58) Field of Classification Search
CPC ......... G01S 7/4812–4818; G01S 17/58; G01S 17/95
See application file for complete search history.

(56) References Cited

U.S. PATENT DOCUMENTS

| H001702 H | * | 1/1998 | Esman ........................ 398/201 |
| 5,724,125 A | * | 3/1998 | Ames ........................ G01P 5/26 |
| | | | 356/28.5 |

(Continued)

FOREIGN PATENT DOCUMENTS

| CN | 1379264 A | 11/2002 |
| CN | 1668939 A | 9/2005 |

(Continued)

OTHER PUBLICATIONS

Rodrigo et al. "Influence of laser frequency noise on scanning Fabry-Perot interferometer based laser Doppler velocimetry", Proceedings of SPIE, Photonic Instrumentation Engineering, 899208 (Mar. 8, 2014). (Year: 2014).*

(Continued)

*Primary Examiner* — Eric L Bolda
(74) *Attorney, Agent, or Firm* — Knobbe Martens Olson & Bear LLP

(57) ABSTRACT

The invention relates to a coaxial direct-detection LIDAR system for measuring velocity, temperature and/or particulate density. The system comprises a laser source for emitting a laser light beam having a lasing center frequency along an emission path. The system further comprises an optical delivery system arranged in the emission path of the laser source, the optical delivery system being arranged for delivering the laser light beam in a measuring direction, the optical delivery system further being configured for collecting a return signal backscattered along the measuring direction. Finally, the system comprises a detector system arranged to receive the return signal from the optical deliv- (Continued)

ery system, the detector system comprising a narrowband optical filter and a detector, the narrowband optical filter having a filter center frequency of a pass-band, wherein the center lasing frequency and/or the center filter frequency may be scanned. The invention further relates to an aircraft airspeed measurement device, and a wind turbine airspeed measurement device comprising the LIDAR system.

14 Claims, 2 Drawing Sheets

(51) Int. Cl.
*G01S 17/95* (2006.01)
*G01S 7/491* (2020.01)
*G01S 7/4912* (2020.01)

(56) References Cited

U.S. PATENT DOCUMENTS

| | | | |
|---|---|---|---|
| 6,313,908 B1 | 11/2001 | McGill et al. | |
| 6,518,562 B1* | 2/2003 | Cooper | G01J 3/433 250/222.2 |
| 7,583,364 B1 | 9/2009 | Mayor et al. | |
| 7,635,854 B1* | 12/2009 | Babin | G01F 23/2928 250/573 |
| 2003/0016350 A1 | 1/2003 | Cheng | G01S 17/95 356/301 |
| 2004/0263826 A1 | 12/2004 | Langdon | |
| 2006/0231771 A1* | 10/2006 | Lee | G01N 21/645 250/458.1 |
| 2007/0075546 A1* | 4/2007 | Avagliano | F03D 7/0224 290/44 |
| 2008/0043234 A1 | 2/2008 | Mirand et al. | |
| 2008/0198365 A1* | 8/2008 | Treado | G01J 3/02 356/73 |
| 2009/0046289 A1 | 2/2009 | Caldwell et al. | |
| 2009/0316134 A1* | 12/2009 | Michael | G01C 3/08 356/4.01 |
| 2011/0181864 A1 | 7/2011 | Schmitt et al. | |
| 2011/0188029 A1 | 8/2011 | Schmitt et al. | |
| 2014/0158870 A1* | 6/2014 | DeAntonio | G01S 7/4814 250/216 |

FOREIGN PATENT DOCUMENTS

| | | |
|---|---|---|
| CN | 1831562 A | 9/2006 |
| CN | 101299066 A | 11/2008 |
| CN | 101321021 A | 12/2008 |
| CN | 101776760 A | 7/2010 |
| CN | 101849196 A | 9/2010 |
| CN | 102854514 A | 1/2013 |
| EP | 0 645 645 A1 | 3/1995 |
| EP | 1 152 260 A1 | 11/2001 |
| JP | 2003-283024 A | 10/2003 |

OTHER PUBLICATIONS

Avidor, Joel M. "Novel Instantaneous Laser Doppler Velocimeter" Applied Optics, Feb. 1974, pp. 280-285, vol. 13, No. 2.

Benedetti-Michelangeli, G. et al., "Measurement of Aerosol Motion and Wind Velocity in the Lower Troposphere by Doppler Optical Radar" Journal of the Atmospheric Sciences, Jul. 1972, pp. 906-910, vol. 29.

Chan, Kin Pui et al., "Heterodyne Doppler 1-μm lidar measurement of reduced effective telescope aperture due to atmospheric turbulence", Applied Optics, 1991, pp. 2617-2627, vol. 30, Issue 18.

Eggins, P.L. et al., "Laser-Doppler velocity measurements in an under-expanded free jet" J. Phys. D.: Appl. Phys., 1974, pp. 1894-1906, vol. 7.

Kuriger, W.L. "A Laser Doppler Velocimeter Employing a Scanning Interferometer" Proceedings Letters, p. 2161, Aug. 1969, IEEE 57.

Marinov, Vladimir Stoykov et al., "Using the spectral asymmetry of TEA $CO_2$ laser pulses to determine the Doppler-shift sign in coherent lidars with low frequency stability" Applied Optics, Apr. 20, 1999, pp. 2579-2585, vol. 38, No. 12.

International Search Report for PCT/DK2014/050128 dated Sep. 3, 2014.

* cited by examiner

COAXIAL DIRECT-DETECTION LIDAR-SYSTEM

CROSS REFERENCE TO RELATED APPLICATIONS

This application is a U.S. National Phase Application of PCT International Application Number PCT/DK2014/050128, filed on May 6, 2014, designating the United States of America and published in the English language, which is an International Application of and claims the benefit of priority to European Patent Application No. 13166628.1, filed on May 6, 2013. The disclosures of the above-referenced applications are hereby expressly incorporated by reference in their entireties.

FIELD OF THE INVENTION

The present invention relates to LIDAR system for measuring velocity of remote solid or diffuse targets. More specifically, the invention relates to a coaxial direct-detection LIDAR system. For diffuse targets such as air-borne particles, the LIDAR can also be used to measure temperature and particulate density.

BACKGROUND OF THE INVENTION

LIDAR systems for measuring wind velocity based on Doppler shift are well known in the literature. Generally, such systems employ coherent detection (heterodyne or homodyne detection) in order to detect the small wavelength shifts associated with the Doppler shift and the weak signals backscattered to a detector of the system, by mixing the backscattered signals with a reference or local oscillator signal, and detecting the mixed signal.

An example of a transmitter for a coherent Doppler LIDAR is disclosed in Marinov, et al., "*Using the spectral asymmetry of TEA CO2 laser pulses to determine the Doppler-shift sign in coherent lidars with low frequency stability*", Applied Optics, 38(12), 1999.

To use coherent detection, the coherence length of a laser source used must be at least equal to a round-trip distance from the source to a probe volume and back to the detector system, often on the order of several hundred meters. This is a rather strict requirement, which is typically only met by expensive and sophisticated laser sources.

In coherent detection, the weak signal to be detected is mixed with a relatively strong reference or local oscillator signal, e.g. on the order of 1 mW. While this provides an amplification of the signal to be detected, it also induces a significant shot-noise contribution to the detected signal. This shot-noise is typically the dominant noise source in such systems, and thus limits the obtainable signal-to-noise ratio (SNR)

Another limitation of coherent detection is imposed by phase-induced intensity noise (PIIN), also known as beat or interference noise, which is caused by beating of unwanted internal reflections from the LIDAR system with a local oscillator signal.

In coherent detection, sign of Doppler shift is not determined unless additional means are used (e.g. use of acousto-optic modulators), which increases system complexity and cost.

Hence, an improved LIDAR system would be advantageous, and in particular a LIDAR system with an improved signal-to-noise ratio (SNR) and ability to readily obtain sign of Doppler shift would be advantageous.

OBJECT OF THE INVENTION

It is a further object of the present invention to provide an alternative to the prior art.

In particular, it may be seen as an object of the present invention to provide a LIDAR system that solves the above mentioned problems of the prior art while relaxing the previous strict requirements of the laser source.

SUMMARY OF THE INVENTION

Thus, the above-described object and several other objects are intended to be obtained in a first aspect of the invention by providing a coaxial direct-detection LIDAR system for measuring velocity, temperature and/or particulate density. The system comprises a laser source for emitting a laser light beam having a lasing center frequency along an emission path. The system further comprises an optical delivery system arranged in the emission path of the laser source, the optical delivery system being arranged for delivering the laser light beam in a measuring direction, the optical delivery system further being configured for collecting a return signal backscattered along the measuring direction. Finally, the system comprises a detector system arranged to receive the return signal from the optical delivery system, the detector system comprising a narrowband optical filter and a detector, the narrowband optical filter having a filter center frequency of a pass-band, wherein the center lasing frequency and/or the center filter frequency may be scanned. In this way, a particularly simple and compact LIDAR system may be achieved for measuring a Doppler shift and thus velocity, temperature and/or particulate density. Furthermore, an improved signal to noise ratio (SNR) may be achieved, as the detrimental effect of optical shot noise as observed in systems using coherent detection is substantially eliminated. The requirement on coherence length of the laser source which applies to coherent detection systems is relaxed in the LIDAR system of the present invention. Thus, the requirement on coherence length in this system is dependent on the configuration of the detector system used. If, e.g. one or more Fabry-Perot interferometers (FPIs) are employed, the coherence length should be sufficiently long to span multiple round-trips of the FPI(s), typically on the order of a few meters or a few tens of meters. This is typically significantly shorter than from the source to the probe volume and back to the detector, as e.g. required in coherent detection. A further advantage of using direct-detection, is that the sign of speed is easily obtained, as the wavelength of the Doppler shifted signal is directly measured, and the sign results in the Doppler shifted signal being either longer or shorter in wavelength compared to the emitted laser wavelength.

In the context of the present patent application, a "coaxial" LIDAR system is to be understood as a LIDAR system in which the emission path of the laser source coincides with the path of the backscattered light through at least a part of the LIDAR system. In other words, the optical delivery system used to emit the laser light is also used to collect the backscattered light. Coaxial LIDAR systems are also sometime referred to as "monostatic". Important advantages of using a coaxial configuration as compared to a biaxial/bistatic include: A higher receiver efficiency for the backscattered signal; Fewer optical components (transmitter is also the receiver—or the optical transceiver); No need for complex and tedious alignment. In a biaxial/bistatic configuration, optimum alignment requires the receiver optics to image the focus of the transmitted beam onto the detector.

In comparison, the Marinov reference, as cited above, only shows the transmitter part in the figures, and does therefore not disclose a coaxial LIDAR system.

Furthermore, the reference concerns coherent LIDARS, and does therefore not disclose a direct-detection LIDAR.

Using the inventive LIDAR system as described here results in a direct measurement of the frequency shift associated with e.g. the Doppler shift due to a relative velocity difference between the target and the system. If the shift is small, compared to the spectral width of the reference signal peak, there may be a spectral overlap between the reference signal peak and the backscattered signal peak. In this case, it is envisioned, that the response arising from the reference signal may be subtracted by data processing from the combined signal by exploiting the knowledge that the reference peak will have a substantially Lorentzian profile.

Embodiments of the inventive LIDAR system can also measure the profile of the Doppler shifted spectrum (typically, Gigahertz wide) associated with Rayleigh backscatter from molecules in the probed volume of air or liquid medium. The width of the spectrum associated with Rayleigh backscatter increases with temperature and thus can be used to determine the temperature of the probe volume in a remote manner. Furthermore, density or concentration of particles, or the molecular-to-aerosol backscatter ratio in the probe volume can also be deduced from the relative strengths of the broad (Gigahertz wide) molecular signal and the narrow (Megahertz wide) aerosol signal. The advantage of the inventive system over coherent detection LIDARs is the ability to measure the Gigahertz wide spectrum without the need for high speed detector with a few Gigahertz of bandwidth.

In the context of the specification, the term "narrowband" is to be understood as the filter having a pass-band with a narrow frequency/spectral width, relative to the center frequency/wavelength.

In an embodiment of the invention, a ratio of the frequency width of the pass-band to the center frequency is less than about $10^{-5}$, such as less than about $10^{-6}$, or even less than about $10^{-7}$.

In an embodiment of the invention, the frequency width of the pass-band is in the range 0.1 MHz-100 MHz, such as in the range 0.4 MHz-50 MHz, or even in the range 0.8 MHz-10 MHz.

In an embodiment of the invention, the frequency width of the pass-band, $\Delta f$, is selected for a given lasing center wavelength, $\lambda$, to result in a line-of-sight velocity resolution, $\Delta v$, as calculated with the formula: $\Delta v = \frac{1}{2}\lambda \Delta f$, in the range 0.1-10 m/s, such as 0.5-8 m/s, or even 0.7-5 m/s.

In an embodiment of the invention, the optical narrowband filter comprises a scanning Fabry-Perot interferometer.

In an embodiment of the invention, the scanning Fabry-Perot interferometer is a fiber scanning Fabry-Perot interferometer.

One example of a suitable fiber scanning Fabry-Perot interferometer is available from Micron Optics (http://www.micronoptics.com/) under the model name FFP-SI.

In an embodiment of the invention, the detector system further comprises an optical small signal pre-amplifier. In this way, the need for laser power is minimized, while maintaining a desired SNR. Reducing the laser power needed has several advantages, e.g. reduced power consumption, wider selection of laser sources available, relaxed eye-safety requirements, and generally improved reliability of the laser source.

In one embodiment, an amplified signal from the optical small signal pre-amplifier is subsequently filtered with a bandpass filter. In this way, a significant portion of the wideband amplified spontaneous emission (ASE) noise may be suppressed, before the signal is detected by the detector. Further noise suppression stages may be achieved by an optional static FPI (e.g. etalon) and the final scanning FPI (static FPI is used instead of scanning FPI if laser frequency is tunable).

In an embodiment of the invention, the detector is or comprises a photon-counting device. In this way, the SNR may be even further improved, thus allowing for the detection of even smaller signals.

In an embodiment of the invention, the laser source is tunable and the narrowband optical filter is static. In this way, instead of mechanically scanning the FPI, the same Doppler measurement principle is possible with a static FPI when the laser center frequency is tuned. This avoids or alleviates mechanical stability, and wear and tear issues associated with use of scanning FPIs. Tunable lasers are readily commercially available. Frequency tuning of a tunable laser may be faster than common piezoelectric scanning of FPIs.

In an embodiment of the invention, the laser source is adapted for emitting infrared light with a wavelength of about 1.3 μm to about 1.8 μm, such as about 1.4 μm to about 1.7 μm, or even such as about 1.5 μm to about 1.6 μm. Laser sources in this range are readily available, due to their widespread use in the field of telecommunication. Furthermore, laser light in these wavelength ranges is generally considered to be "eye-safe", in that such wavelengths are strongly absorbed in the cornea and lens of the eye, and thereby to a large extend prevented from damaging the retina. For this reason, handling, operation and installation of the LIDAR system operating in these wavelength ranges requires much less strict safety precautions.

In an embodiment of the invention, the laser source is adapted for emitting light with a wavelength of about 300 nm to about 1500 nm, such as about 350 nm to about 1200 nm, or even such as about 400 nm to about 900 nm. The inventive LIDAR system has surprisingly been found to facilitate lowering the emitted laser power while maintaining a suitable SNR. Therefore, laser wavelengths which are not commonly considered "eye-safe" may be used without danger.

In another embodiment of the invention, the laser source is adapted for emitting light with a wavelength of about 2 μm to about 10 μm. In this way, a LIDAR system may be realized with improved light penetration into fog or rain, when compared to operating at shorter wavelengths. The wavelength may be selected to correspond to molecular resonances in target molecules, to enable measurement of specific gas species.

In an embodiment of the invention, the laser source is or comprises a laser diode configured for directly emitting the laser light beam. Such laser diodes for operation in the infrared range are readily available due to their widespread use in the field of telecommunications and are attractive as economical laser sources for industrial products. However, a beam quality of such lasers diode is generally not sufficiently high for use in prior art LIDAR systems. Surprisingly, however, the present inventors have realized that by employing direct detection, i.e. no coherent detection, laser diodes may nevertheless be adequate for measuring wind velocities with a suitable SNR. Thus, these laser sources offer adequate performance at relatively low cost. Furthermore, such laser diodes have been optimized to yield a long life time, resistant to mechanical vibrations, and are maintenance free.

In an embodiment of the invention, the laser source is adapted for generating laser light with an optical power from about 1 mW to about 500 mW, such as about 5 mW to about 100 mW, or even such as about 8 mW to about 20 mW. Due to the use of a highly sensitive detector system, a surprisingly low laser power is required to obtain a suitable SNR. This has a number of advantages, such as low power consumption, potentially long life time, improved eye safety, etc.

In an embodiment of the invention, the laser source is pulsed. In this way, a detrimental effect of unwanted reflections from the optical delivery system may be suppressed, i.e. by ensuring that the temporal pulse length is less than a transit time of the pulse from the source to the probe volume and back to the detector. In this way, any internal reflections from the outgoing pulse will have vanished before the return signal re-enters the LIDAR system, so as to not influence the detector. On the other hand, the pulses should be long enough to build up the interference signal from multiple round-trips in the Fabry-Perot interferometer.

In one embodiment of the invention, the laser source is configured to emit laser pulses with a temporal pulse length from about 0.1 µs to about 5 µs, such as from about 0.3 µs to about 3 µm, or even from about 0.5 µs to about 1.5 µm.

In an embodiment of the invention, the laser source is continuous wave, CW. Thus, a particularly simple laser source may be used, due to the generally lower cost of CW laser sources and the less complicated electronics and signal processing associated therewith.

In an embodiment of the invention, the Fabry-Perot interferometer has a free spectral range FSR in the range from about 0.5 GHz to about 10.0 GHz, such as from about 0.8 GHz to about 6.0 GHz, or even from about 1.0 GHz to about 4.0 GHz.

In an embodiment of the invention, the Fabry-Perot interferometer has a finesse F in the range from about 50 to about 5000, such as from about 100 to about 1000, or even from about 200 to about 600. The measurement resolution of wind velocity is directly given by the resolution of the Fabry-Perot interferometer, e.g. as specified by the full-width half-maximum (FWHM) of a resonance peak measured in the frequency domain. This FWHM is again determined as a ratio of the FSR and the finesse of the interferometer. By configuring the Fabry-Perot interferometer to have a finesse in the abovementioned ranges, the resolution of the Fabry-Perot interferometer may be made sufficient high to give suitable wind speed measurement precision for most applications.

According to a second aspect, the invention is particularly, but not exclusively, advantageous for obtaining an aircraft airspeed measurement device, comprising the LIDAR system according to any one of the abovementioned embodiments. In this way, the hitherto used pitot tubes may be replaced and/or supplemented with the device according to the invention. Pitot tubes are prone to being clogged or freezing, thus giving rise to false measurements. This has been linked to several security incidents or even crashes of aircrafts resulting in loss of life. Application of the inventive LIDAR system for this use has the benefit when compared with other LIDAR systems of providing a particularly robust system, with an increased vibration tolerance and low requirements for maintenance, while comprising relatively few components. The low component count and applicability of low cost laser diode sources has the potential to provide a cost attractive LIDAR system. The inventive LIDAR system is particularly advantageous for aircraft airspeed measurements, due to the very high sensitivity resulting from the large reduction in shot noise as explained above. This is due to the fact that concentrations of aerosols in typical aircraft cruising altitudes are orders of magnitude smaller than the concentration near the earth surface. Backscattering caused by aerosols is a significant contributor to the total received signal in LIDAR systems operating near the surface.

Furthermore, according to a third aspect, the invention is particularly, but not exclusively, advantageous for obtaining a wind turbine airspeed measurement device, comprising the LIDAR system according to any one of the abovementioned embodiments. For wind turbines, steadily increasing in size, reliable wind speed measurements of the approaching wind field are becoming more and more important. Traditionally, wind turbines have been operated based on wind data from cup anemometers located behind the rotor plane of the turbine, i.e. being a reactive control, or alternatively from a centrally located anemometer providing data to a field of turbines. However, such a system is not able to control the individual wind turbine in response to local variations in the wind field ahead of the turbine. The abovementioned advantages relating to the aircraft airspeed measurement device also applies to the wind turbine airspeed measurement device, namely the robust, low cost system requiring little or no human intervention.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The LIDAR system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
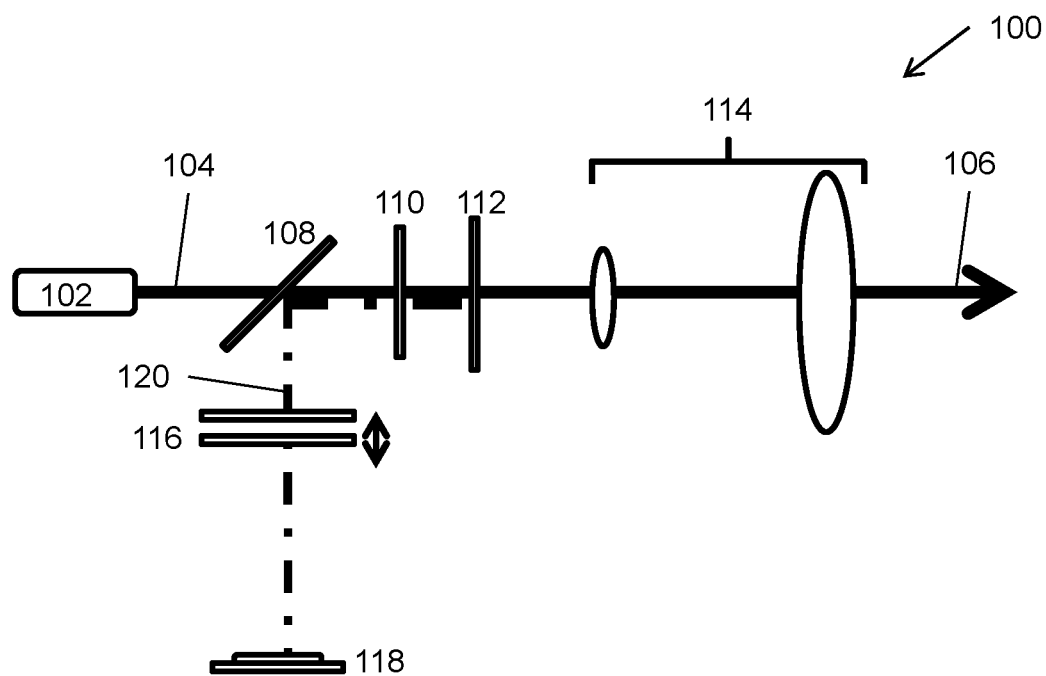
FIG. 1 illustrates an embodiment of the inventive system.

FIG. 1 illustrates one embodiment of the LIDAR system 100 according to the invention. A laser 102, such as a laser diode, generates an outgoing laser light beam 104, which is emitted along an emission path 106. The laser light beam 104 passes through a polarizing beam splitter 108, a quarter-wave plate 110, and a partial reflector 112 for providing a reference beam. Then the beam is focused by an optical delivery system, here shown as a telescope setup 114 into a measurement volume (outside the figure). Along the emission path, the beam is scattered, e.g. by Mie scattering of aerosols and Rayleigh scattering of atmospheric gas particles. Light scattered back along the emission path within the measurement volume is then collected by the telescope 114, and analysed by a narrowband optical filter in the form of a scanning Fabry-Perot interferometer (FPI) 116 before being detected by the detector 118. The return path 120 of the backscattered beam is seen to coincide with the emission path, until the beam splitter 108. Thus, the LIDAR system 100 is coaxial. A small part of the outgoing laser light beam 104 is reflected within the LIDAR system back along the return path 120 as a reference beam, to provide easy calibration of the measurements. In the figure, the backreflection of the reference beam is provided by a dedicated, partial reflector 112. However, in some embodiments, the partial reflector 112 can be removed if other optical element(s) in the system (e.g. the quarter-wave plate 110, or the lenses of the telescope 114) provide a sufficiently large reflection to form the reference beam. The scanning FPI 116 comprises two reflective surfaces with a well-defined but adjustable distance in between. It is here illustrated as two plane reflectors, but may also be provided in other configuration, i.e. such as a confocal FPI, or a fiber-based FPI. The Doppler shift of the backscattered signal is directly measured with the scanning FPI 116, i.e. by scanning the distance between the two reflectors and thus scanning a resonance condition of the FPI. The line-of-sight velocity may be calculated as $v=\frac{1}{2}\lambda f_D$, where $\lambda$ is a lasing center wavelength, corresponding to the lasing center frequency, and $f_D$ is the Doppler shift as measured.

In coherent detection LIDAR systems, increasing the size of the exit telescope lens 114 (keeping the focal length and incident beam profile constant) in an attempt of increasing collection efficiency of backscatter light does not improve the SNR. This may be explained by the fact that only the "useful" backscatter fields that are spatially mode-matched to an optical local oscillator contribute to the coherent detection SNR. In the inventive system using direct-detection however, spatial mode-matching is not required. Therefore, the increase in collected power of backscatter light that goes with the increase in lens diameter improves the SNR (see e.g. "Heterodyne Doppler 1-μm lidar measurement of reduced effective telescope aperture due to atmospheric turbulence", Applied Optics 30(18), pp. 2617-2627, 1991).

Example 1

In an example relating to the embodiment shown in FIG. 1, the scanning FPI 116 has a free-spectral range (FSR) of 1 GHz and a finesse of about 500. The full-width half-maximum (FWHM) of the FPI peak is about 2 MHz. Peak transmission of the FPI at a wavelength of 1575 nm is about 14%. The laser emits at a wavelength of 1575 nm, and a femtowatt photoreceiver acts as the detector.

Figure 2:
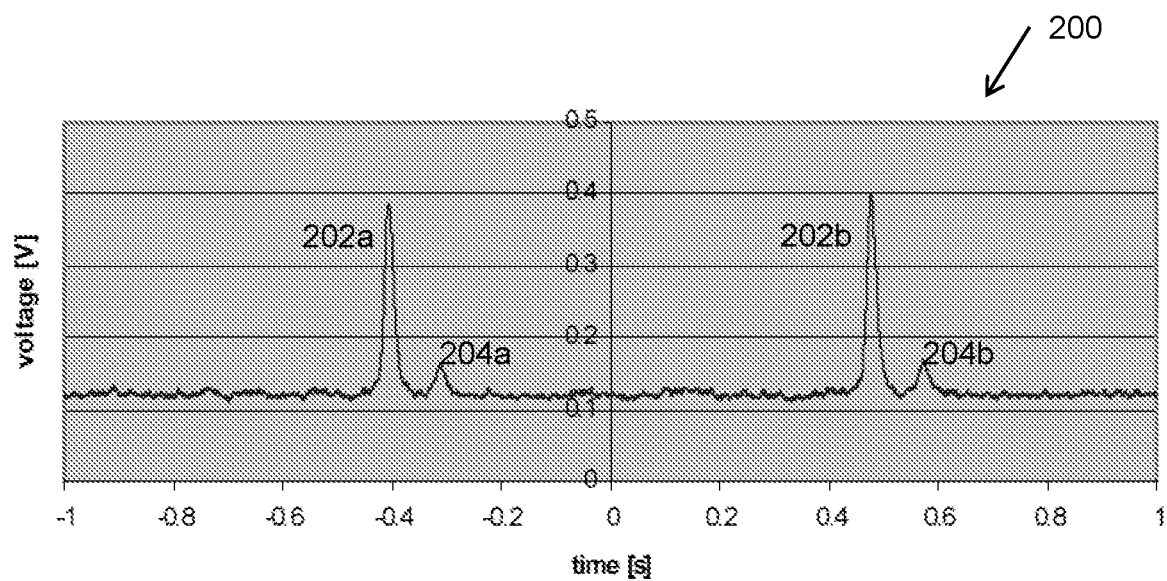
FIG. 2 shows experimental data from the inventive system.

FIG. 2 shows an experimental scan 200 acquired with the system of example 1. The voltage values on the ordinate axis correspond to optical intensity measured by the detector 118, and the time values on the abscissa axis correspond to peak frequencies of the scanning FPI 116. The plot shows two scans, producing two sets of peaks 202a/204a and 202b/204b, respectively. The largest peaks 202a and 202b show the reference signal, i.e. indicating no Doppler shift. The smaller peaks 204a and 204b show the backscattered signal. The target used is a rotating disk, giving rise to a Doppler shift of approximately 10 MHz, corresponding to a radial speed of 7.9 m/s. It is seen that the inclusion of the reference signal 202 allows for a convenient calibration of the frequency shift axis, and thus for a simple data processing.

Figure 3:
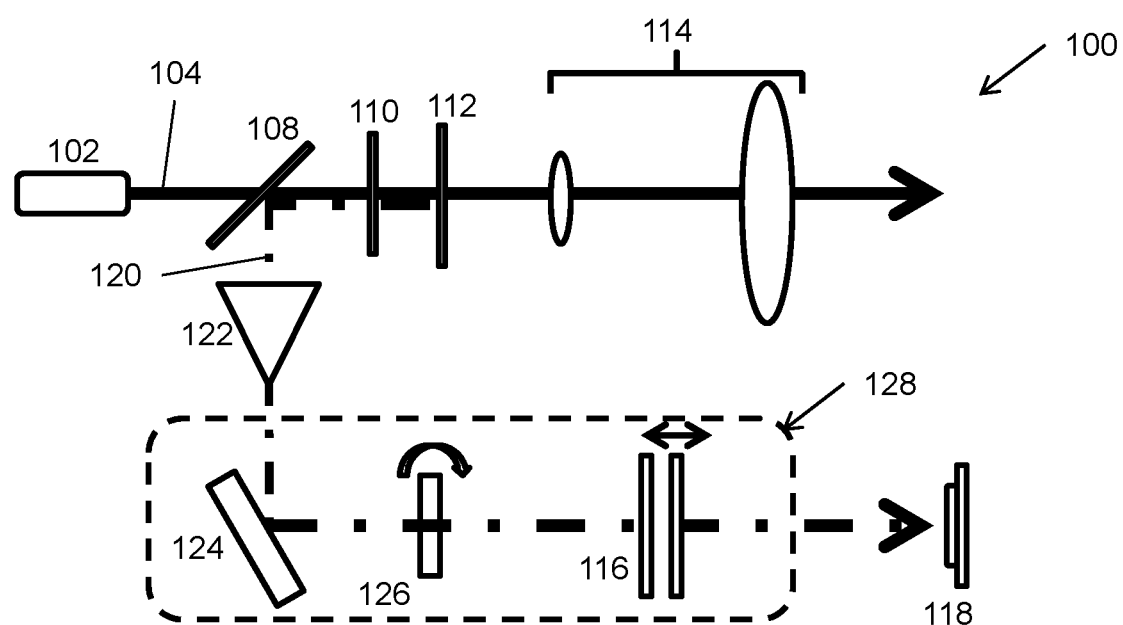
FIG. 3 illustrates another embodiment of the inventive system.

FIG. 3 illustrates another embodiment of the LIDAR system according to the invention. This embodiment relates to the embodiment shown in FIG. 1, where same reference numerals refer to identical or similar parts. Therefore, only the differences between the two embodiments are discussed here. This embodiment only differs in the detection part, not in the emission path. In this embodiment, the return part 120 also comprises an optical small-signal pre-amplifier 122. In this way, the SNR of the received signal may be significantly improved before detection, without compromising the eye-safe operation of the LIDAR system. As the pre-amplifier 122 will introduce noise contributions at other wavelengths than the return signal, the amplified signal is band-pass filtered, here using an optical filter 124, and a static FPI (e.g. etalon) 126. A wide selection of optical filters 124 may be envisioned, such as a volume Bragg grating, or a combination of a diffraction grating and a spatial filter (e.g. single-mode fiber). The optical filter 124 acts to suppress a majority of the broadband "daylight/ambient" background and/or the ASE noise inherent from amplifier 122. Also embodiments of the LIDAR system without a pre-amplifier 122 (such as the embodiment of FIG. 1), may benefit from including the optical filter 124 to block background daylight. The return signal may pass further optical components, e.g. a polarizer (not shown). After the filtering, the signal is analysed using the scanning FPI 116 and a detector 118, as discussed for the embodiment of FIG. 1. The optical filter 124, the solid FPI 126, and the scanning FPI 116 together form a narrowband optical filter 128, which in this embodiment is tunable.

Example 2

In an example relating to the embodiment shown in FIG. 3, the optical filter 124 is an optical reflection grating with a wavelength resolution of 0.2 nm. The solid FPI 126 is a 2 mm etalon with a finesse of 100. The combined tunable band-pass filter 128 has a resolution of about 2 MHz.

Example 3

In an example relating to the embodiment shown in FIG. 3, the narrowband optical filter 128 suppresses the very broadband background light (and possibly ASE) by band-pass filtering in three-stages: First optical filter 124 will limit the band to about 0.2 nm or a 25 GHz band. Then static FPI 126 further reduces the band to say 100 MHz (enough to cover speeds from −40 to +40 m/s). Further noise filtering is done by the final FPI (scanning or static if the laser frequency is tunable).

Although the present invention has been described in connection with the specified embodiments, it should not be construed as being in any way limited to the presented examples. For instance, the invention has been illustrated with embodiments implemented with a scanning Fabry-Perot interferometer. However, embodiments of the invention may also be implemented using a static optical filter (such as a Fabry-Perot etalon) together with a wavelength sweepable laser source The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A coaxial direct-detection LIDAR system for measuring velocity, temperature and/or particulate density, the system comprising:
   a laser source for emitting a laser light beam having a lasing center frequency along an emission path,
   an optical delivery system arranged in the emission path of the laser source, the optical delivery system being arranged for delivering the laser light beam in a measuring direction, the optical delivery system further being configured for collecting a return signal backscattered along the measuring direction, and
   a detector system arranged to receive the return signal from the optical delivery system, the detector system comprising a narrowband optical filter and a detector, wherein the narrowband optical filter has a filter center frequency of a pass-band, and wherein the center filter frequency may be scanned.

2. The LIDAR system according to claim 1, wherein the optical narrowband filter comprises a scanning Fabry-Perot interferometer.

3. The LIDAR system according to claim 1, wherein the detector system further comprises an optical small signal pre-amplifier.

4. The LIDAR system according to claim 1, wherein the detector is or comprises a photon-counting device.

5. The LIDAR system according to claim 1, wherein the laser source is adapted for emitting infrared light with a wavelength of about 1.3 μm to about 1.8 μm, about 1.4 μm to about 1.7 μm, or about 1.5 μm to about 1.6 μm.

6. The LIDAR system according to claim 1, wherein the laser source is adapted for emitting light with a wavelength of about 300 nm to about 1500 nm, about 350 nm to about 1200 nm, or about 400 nm to about 900 nm.

7. The LIDAR system according to claim 1, wherein the laser source is or comprises a laser diode configured for directly emitting the laser light beam.

8. The LIDAR system according to claim 1, wherein the laser source is adapted for generating laser light with an optical power from about 1 mW to about 500 mW, about 5 mW to about 100 mW, or about 8 mW to about 20 mW.

9. The LIDAR system according to claim 1, wherein the laser source is pulsed.

10. The LIDAR system according to claim 1, wherein the laser source is continuous wave, CW.

11. The LIDAR system according to claim 2, wherein the Fabry-Perot interferometer has a free spectral range FSR in the range from about 0.5 GHz to about 10.0 GHz, about 0.8 GHz to about 6.0 GHz, or about 1.0 GHz to about 4.0 GHz.

12. The LIDAR system according to claim 2, wherein the Fabry-Perot interferometer has a finesse F in the range from about 50 to about 5000, from about 100 to about 1000, or about 200 to about 600.

13. An aircraft airspeed measurement device, the device comprising the LIDAR system according to claim 1.

14. A wind turbine airspeed measurement device, the device comprising the LIDAR system according to claim 1.

* * * * *